United States Patent [19]

Blaisdell

[11] Patent Number: 4,990,101

[45] Date of Patent: Feb. 5, 1991

[54] COVER FOR CIRCULAR ELECTRICAL CONNECTORS

[75] Inventor: Kenneth C. Blaisdell, Phoenix, Ariz.

[73] Assignee: ITT Corporation, New York, N.Y.

[21] Appl. No.: 445,072

[22] Filed: Dec. 1, 1989

[51] Int. Cl.[5] .............................................. H01R 4/38
[52] U.S. Cl. ...................................................... 439/320
[58] Field of Search ................ 439/307, 308, 309, 314, 439/315, 317, 320, 321, 322, 323, 332, 335, 338, 339, 340; 285/70, 81, 82, 325, 373, 419; 411/910, 373, 431; 70/232

[56] References Cited

U.S. PATENT DOCUMENTS

| 244,612 | 4/1990 | Burns | D13/24 |
|---|---|---|---|
| 1,433,382 | 10/1922 | Kiper | 285/92 |
| 1,495,586 | 5/1924 | George | 439/308 |
| 1,676,728 | 7/1928 | Cooke | 439/308 |
| 2,400,338 | 5/1946 | Cadman | 285/89 |
| 3,155,448 | 11/1964 | Korsgren, Jr. | 339/201 |
| 4,053,195 | 10/1977 | Laverick et al. | 439/208 |
| 4,163,594 | 8/1979 | Aujla | 439/307 |
| 4,422,675 | 12/1983 | Norris et al. | 285/51 |
| 4,426,108 | 1/1984 | Kesselman | 292/307 |
| 4,461,526 | 7/1984 | Gallusser et al. | 439/312 |
| 4,462,653 | 7/1984 | Flederbach et al. | 439/312 |
| 4,645,281 | 2/1987 | Burger | 439/305 |
| 4,674,909 | 6/1987 | Bentson | 285/82 |

Primary Examiner—Joseph H. McGlynn
Assistant Examiner—Ken D. Vu
Attorney, Agent, or Firm—Thomas L. Peterson

[57] ABSTRACT

A cover (40, FIG. 1) is provided for installation on an electrical connector to prevent rotation of a coupling nut (24) relative to the body (22) of the connector, which can be readily installed and removed. The cover is in the form of a tube. The tube is constructed of resilient material and has a slot (46) forming a pair of slot edges that can be spread apart to move the cover sidewardly onto or off of the connector. There is a space between the inside of the cover and the connector, with the space (78, FIG. 2) being greater around the nut than around a rearward portion (50) of the body so that compression of the cover causes it to grip the body rather than the nut. The cover has an inwardly-extending ridge-like projection (64) that fits in a recess of the connector between the rear of the nut and the front of an enlarged part of the connector body to limit axial movement of the cover. The ridge is of reduced thickness at locations (80, 82 in FIG. 4) spaced on either side of the slot, to facilitate bending of the cover to separate the slot edges. The slotted cover design can be used to hold a marking identifying the connector.

13 Claims, 3 Drawing Sheets

COVER FOR CIRCULAR ELECTRICAL CONNECTORS

BACKGROUND OF THE INVENTION

Mated circular electrical connectors (that carry electrical currents or light waves) are often held together by a coupling nut rotatably mounted on the body of a first connector and which engages a thread on the second connector. A cover can be placed around the coupling nut to prevent turning it relative to the first connector body, so as to prevent unauthorized disconnection. A common type of cover is a heat shrinkable tubing slipped onto one of the connectors before mating, and which is later slipped over the coupling nut and connector body and heated to shrink it in place. Heat shrink tubing has disadvantages, including the fact that it is used only once, the connector may be nicked when the tubing is cut off, and heat required to shrink the tubing is not usable in an explosive atmosphere. Other types of covers have been proposed, such as a Velcro band, but no known covers have been satisfactory. A cover which could be rapidly installed and removed from a connector, and which was of simple design, would be of considerable value.

SUMMARY OF THE INVENTION

In accordance with one embodiment of the present invention, a cover is provided for use with an electrical connector system, which can be easily installed and removed and which is of simple construction. For a connector with a coupling nut rotatable relative to the connector body, a cover which guards against unauthorized turning of the nut is of substantially tubular shape. The tubular cover is formed of resilient material and has a slot extending along its length that forms a pair of slot edges that can be spread apart to sidewardly install or remove the cover, with the slot edges then springing together to leave a narrow slot between them. The cover has a pair of shoulders facing at least partially forward and rearwardly and which abut locations on the connector to prevent axial movement of the cover once it is installed on the connector.

The cover is formed so there is a larger space between a forward portion of the cover and the coupling nut, than between a rearward portion of the cover and the connector body. As a result, compression of the cover results in it gripping the body rather than the coupling nut. The cover can be formed with an inwardly-extending protrusion or ridge which fits in a recess of the connector that lies between the rear of the nut and an enlarged rearward portion of the connector body. The ridge has a reduced thickness at locations spaced at least 45° on either side of the slot, to facilitate spreading apart of the slot edges. A cover formed by a tube with a slot in it, which fits around a portion of a connector (which may or may not include the coupling nut) can bear a marking that identifies the connector and especially a cable to which the connector is attached.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
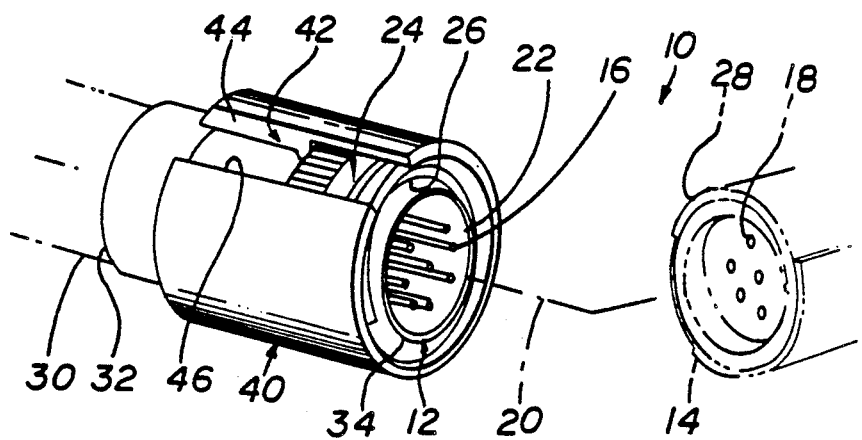
FIG. 1 is a perspective view of a connector system of the invention, with the cover installed on a first connector and also showing in phantom lines a mateable second connector.

FIG. 1 illustrates a connector system 10 of the present invention, which includes first and second connectors 12, 14 that can be mated so contacts 16 on the first connector engage contacts 18 on the second one. The connectors are of the circular type, in that their outside is generally circular as viewed along the axis 20 of a connector such as the first one 12. The connector 12 includes a body 22 and a coupling nut 24 that is rotatably mounted on the body and which has short threads (26) that threadably mate with corresponding threads 28 on the second connector. A cable 30 extends from the rear end 32 of the connector, which lies opposite the mating front end 34. After the two connectors 12, 14 are mated and the coupling nut 24 has been screwed onto the second connector, a cover 40 is installed. The cover 40 prevents rotation of the coupling nut in a direction that would loosen it and allow the connectors to be pulled apart.

Figure 4:
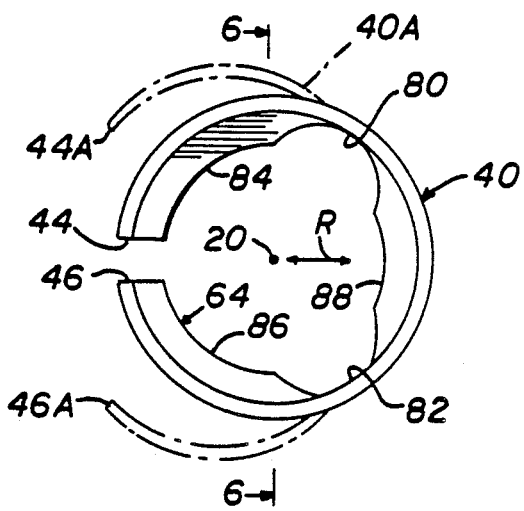
FIG. 4 is an end view of the cover of FIG. 3, taken on the line 4—4 thereof.

The cover 40 is of substantially tubular shape, with an axis coincident with the axis 20 of the connector when installed thereon. The cover has a slot 42 extending along its length, largely parallel to the axis 20, and which forms a pair of cover slot edges 44, 46. The cover is formed of a resilient material of low coefficient of friction, such as Nylon, which allows the slot edges to be resiliently forced apart. FIG. 4 shows the cover in an expanded configuration at 40A which enables installation of the cover on the connector by sideward movement of the cover, that is by movement in a radial direction R which is perpendicular to the axis 20 of the cover. In this way, the cover can be easily installed on the connector assembly after the connectors have been mated, and to be similarly removed, without the need for tools.

Figure 2:
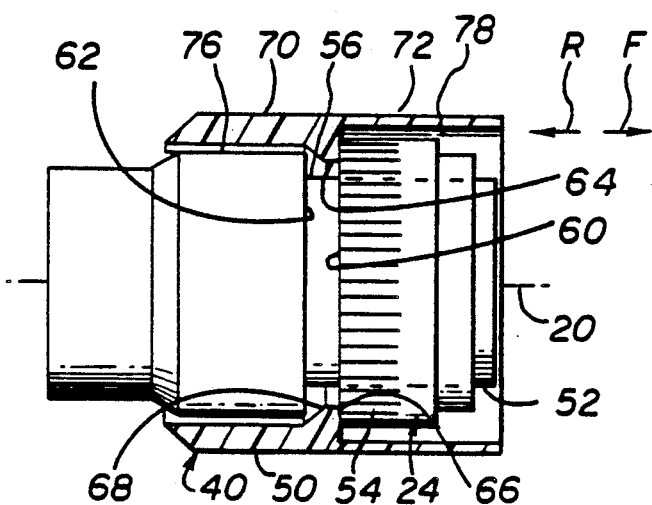
FIG. 2 is a sectional side view of the assembly of FIG. 1.
Figure 3:
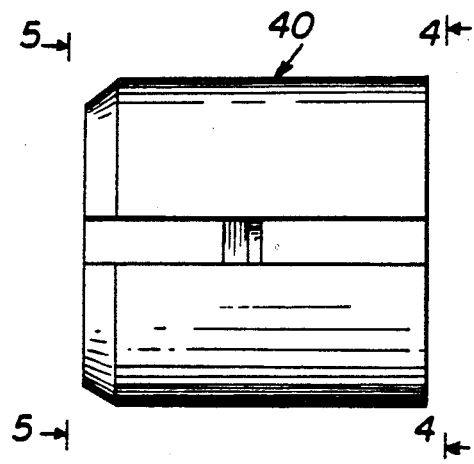
FIG. 3 is a side view of the connector of FIG. 1.

As shown in FIG. 2, the connector body includes an enlarged diameter rearward portion 50 and a reduced diameter forward portion 52, with the coupling nut 24 rotatable about the forward portion. The coupling nut 24 can move axially a small amount, and is shown in FIG. 2 in its most forward position. The nut has a knurled part 54 which is usually grasped in the hand to turn the nut to thread it onto the second connector. When the nut is in its forward position, there is a recess 56 between the rear end 60 of the nut and the front end 62 of the rearward body portion 50.

The cover 40 is constructed with a radially-inwardly extending ridge or projection 64 that is intended to fit into the recess 56. The projection forms a forwardly-facing shoulder 66 that abuts the rear end 60 of the coupling nut, and a partially rearwardly facing shoulder 68 that can abut the front end 62 of the rear body portion. These shoulders limit axial movement of the cover to maintain its axial position around the connector. The forwardly-facing shoulder 66 extends substantially radially as seen in FIG. 2. The rearwardly-facing shoulder 68 extends at a rearward and radially-outward incline so when it engages the body end 62 the front shoulder 66 moves the coupling nut forwardly.

The cover has a first or rearward portion 70 that lies around the enlarged rear body portion 50, and has a second or forward cover portion 72 that lies about the coupling nut 24. The clearance or gap 76 between the rearward cover portion 70 and the rear body portion 50 is less than the clearance 78 between the forward cover portion 72 and the coupling nut 24. As a result, if someone squeezes the cover to try to turn the nut, the cover will first engage the rear body portion 50 so it cannot be easily pressed further to tightly engage the nut 24.

Figure 5:
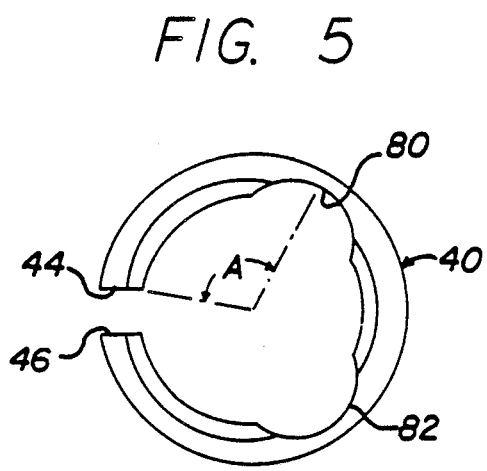
FIG. 5 is end view of the cover of FIG. 3, taken on the line 5—5 thereof.
Figure 6:
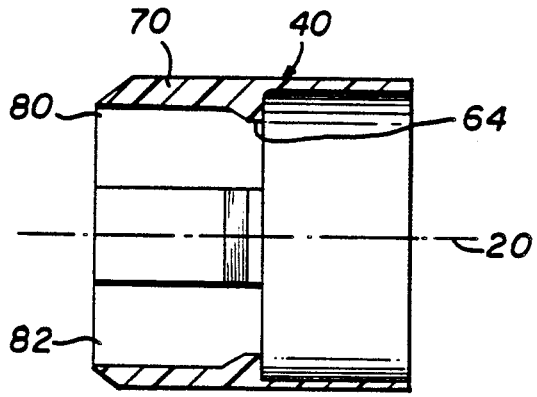
FIG. 6 is a sectional side view of the cover of FIG. 4 taken on the line 6—6 thereof.

As shown in FIGS. 4-6, the projection 64 extends circumferentially along most of the inside of the cover, but it has a pair of narrow locations 80, 82 where the thickness is less than half that at the thicker locations 84-88. The thin locations at 80 and 82 also extend along the thick rearward portion 70 of the cover so that the cover is narrow along its entire length at 80 and 82. As shown in FIG. 4, this narrowing facilitates bending of the cover at these locations 80, 82, to allow the slot edges 44, 46 to separate considerably to positions 44A and 46A, to allow them to move in the radial direction R off of or onto the connector. The angle A between a slot edge 44. 46 and a location such as 80, 82 where the cover is thinner, is preferably at least 45 degrees so moderate bending at the thin location results in large separation of the slot edges.

Figure 7:
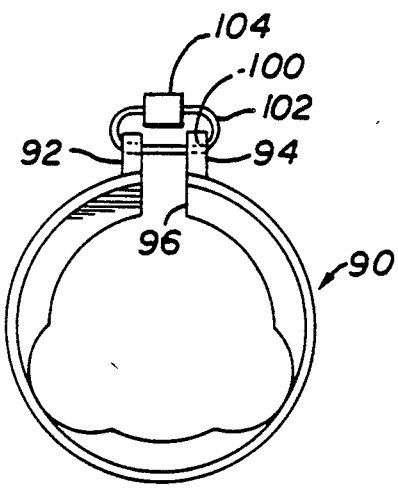
FIG. 7 is an end view of a cover constructed in accordance with another embodiment of the invention.
Figure 8:
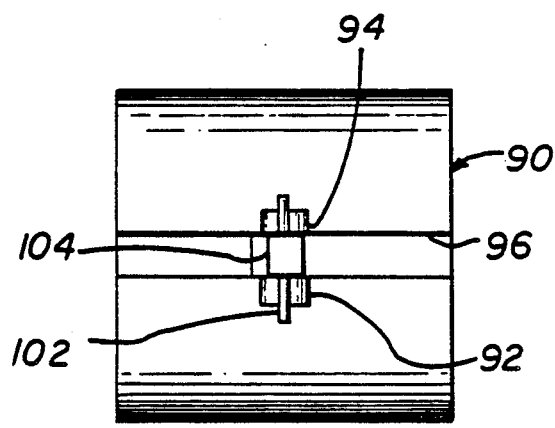
FIG. 8 is side view of the cover of FIG. 7.

FIGS. 7 and 8 illustrate another cover 90 similar to that of FIGS. 1-6, except that the cover includes a pair of radially-outwardly extending tabs 92, 94 at opposite sides of the slot 96. Each tab has a hole 100 for receiving a fastener 102 that limits separation of the slot edges so as to keep the cover securely on the connector. The particular fastener 102 which is shown, includes a wire threaded through the holes in the tabs and a custom retainer 104 that holds the wire ends together so that it is readily apparent if the wire has been cut. A wide variety of fasteners can be used such as screw fasteners, latches, etc.

Figure 9:
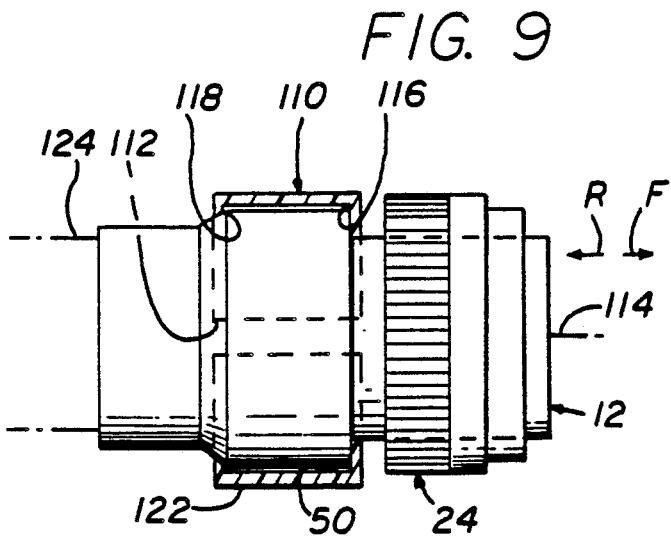
FIG. 9 is a sectional side view of a cover constructed in accordance with another embodiment of the invention, shown mounted on the connector of FIG. 2.
Figure 10:
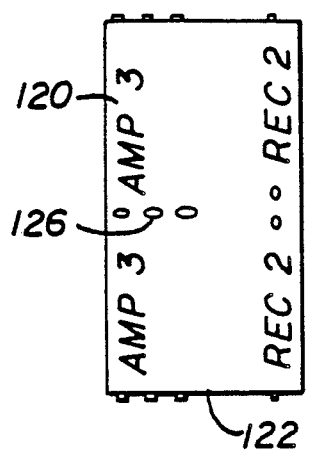
FIG. 10 is a side elevation view of the cover of FIG. 9.
Figure 11:
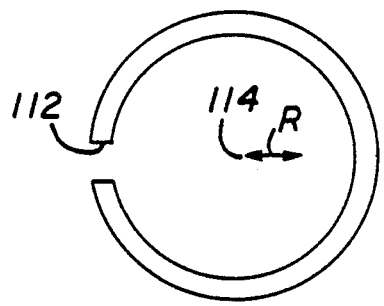
FIG. 11 is an end view of the cover of FIG. 10.

FIGS. 9-11 illustrate another cover 110 which is mounted on a connector 12 of the type shown in the other figures, but with the cover not surrounding the coupling nut 24 hut only a portion of the connector body, which is the rearward portion 50. The cover 110 is formed of resilient material and has a slot 112 with edges that can be moved apart and together to allow the cover to be installed in a sideward or radial direction R relative to the axis 114, onto or off of the connector. The cover has a pair of shoulders 116, 118 facing in rearward and forward directions and which can engage parts of the connector to limit axial movement of the cover. As shown in FIG. 10, the cover carries markings 120 on its outer surface 122 which identify the connector 24 that the cover lies about. For example, the connector may lie at the end of a cable 124 that extends to a particular piece of equipment such as "AMP 3" (amplifier number 3). which should be connected to a particular other connector such as "REC 2" (receiver number 2). The markings on the cover indicate this. In addition, the cover can have markings 126 in the form of bumps that can be felt by a person touching the outside of the cover, to identify the connector where it is difficult to see the cover.

Thus, the invention provides a cover that can be installed on an electrical connector to prevent turning of a coupling nut on the connector and/or to provide a marking identifying the connector. It should be noted that the term "electrical connector" refers to any connector that carries electronic signals which may be electrical currents or light waves. Each cover is in the form of a tube of resilient material with a slot in the tube that forms slot edges that can be separated to allow the cover to be moved in a radial direction onto or off of a connector. The ability to move a connector in a radial direction enables the cover to be installed or removed where there is very little space around the connector. When the cover is installed on a connector, forwardly and rearwardly-facing shoulders abut portions of the connector to limit axial movement of the cover. For a connector which has a recess between the rear of the coupling nut and the front of an enlarged rearward connector body portion, these shoulders can be formed on an inwardly-extending projection that fits in the recess. The projection and a thickened rearward portion of the cover can have thin locations spaced at least 45° from opposite slot edges, to facilitate spreading apart the slot edges to install or remove the cover. The inside surface of the cover is constructed so there is a smaller clearance between the rearward portion of the cover and the connector body, than between a forward portion of the cover and the coupling nut, so that squeezing of the cover causes it to grip the connector body before it grips the coupling cut.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. Apparatus for use with an electrical connector system that includes first and second mateable connectors, said first connector including a body and a coupling nut that is rotatably mounted on said body and that can threadably engage a thread on said second connector, which guards against unwanted turning of the nut, comprising:

a substantially tubular cover having an axis extending in forward and rearward directions, said cover having an internal diameter large enough to fit around said nut, said cover having an internal surface forming a pair of shoulders facing at least partially respectively in said forward and rearward directions and situated to abut locations on at least one of said connectors to limit axial movement of said cover;

said cover having a slot extending largely parallel to said axis to form a pair of cover slot edges that can move apart and together, and said cover being formed of material resilient enough to allow expansion of said cover by separating of said edges so said cover can be moved in a radial direction off said nut.

2. The apparatus described in claim 1 wherein:

said cover lies about most of said coupling nut and extends forwardly and rearwardly of said nut.

3. The apparatus described in claim 1 wherein:
said cover has a forward portion lying about said nut and a rearward portion lying about a part of said connector body that lies rearward of said nut, there being a greater clearance between said cover and said body part than between said cover and said nut, whereby compression of said cover tends to cause it to grip said body part rather than said nut.

4. The apparatus described in claim 1 wherein:
said connector body includes a larger diameter rearward portion and a smaller diameter forward portion, forming an annular recess between said rearward portion and said nut;
said cover has a forward portion lying about said nut, a rearward portion lying about said larger diameter rearward body portion, and a radially-inwardly extending projection lying in said recess and forming said shoulders.

5. The apparatus described in claim 4 wherein:
said projection extends circumferentially along most of the inside of said cover but said projection pair of narrow locations angled at least about 45° about said axis from each side of said slot, whereby to ease spreading apart of the edges of said slot by bending at said narrow locations.

6. The apparatus described in claim 4 wherein:
said forwardly-facing shoulder extends substantially radially, while said rearward-facing shoulder extends at a rearward and radially-outward incline.

7. The apparatus described in claim 1 wherein:
said cover has radially-outwardly extending tabs at opposite sides of said slot, each tab having a hole for receiving a fastener that holds said slot edges from separating.

8. An electrical connector system comprising:
a connector which includes a body with forward and rearward portions and with an axis, and a coupling nut rotatably mounted on said forward portion of said body about said axis;
a cover which is detachably mounted on said connector, said cover comprising a tube of resilient material extending about said axis around said connector, but having edges extending largely parallel to said axis to allow said edges to separate to remove said cover radially off of said connector, said cover having a rearward cover portion lying about said body rearward portion and a forward cover portion lying about said nut;
the clearance between said cover forward portion and said nut being greater than the clearance between said cover rearward portion and said body rearward portion, whereby compression of said cover tends to cause it to grip said body rear portion rather than said nut.

9. An electrical connector system comprising:
a connector which includes a body with forward rearward portions and with an axis, and a coup nut rotatably mounted on said body forward tion about said axis, said nut having a rear end said connector having an annular recess lying tween said nut rear end and said body rearw portion, at least when said nut is pressed forwar
a cover comprising a tube of resilient material can extend about said connector to surround nut and said body rearward portion, but that h slot forming opposite slot edges that can be mo apart to enable removal of said cover in a ra direction;
said cover having a radially-inwardly extending p jection that can lie in said recess of said body, s projection forming forward and rearward sho ders that can respectively abut said nut rear e and said front of said body rear portion.

10. The system described in claim 9 wherein:
said projection has a thick portion near opposite si of said slot and a reduced thickness at an angle o least 45° from each side of said slot, whereby facilitate spreading apart of the slot edges.

11. Apparatus for use with an electrical connecti system that includes a round type connector, to ma said connector;
a substantially tubular cover having an axis extendi in forward and rearward directions, said cov having forward and rearward ends, and said cov forming a pair of shoulders facing at least partial respectively in said forward and rearward dire tions;
said cover formed of resilient material and having slot extending between said forward and rearwa ends to form a pair of cover slot edges that can t resiliently separated to install or remove said cov in a radial direction from said connector;
said cover having markings on its outer surfac which identifies the connector it lies about.

12. The apparatus described in claim 11 wherein:
said cover has a cross-section as seen in a plane nor mal to said axis, wherein it has a smaller thicknes at locations angled at least 45° about said axis fror either side of said slot than at locations spaced les than 45° from either side of said slot, whereby t facilitate opening of said slot.

13. The apparatus described in claim 11 wherein:
said connector has a coupling nut, but said cover lie only about a portion of said connector body that i rearward of said nut.

* * * * *